Oct. 12, 1948.　　　G. D. RECHTON　　　2,451,356
HOLLOW RIVET FOR PRESSURAL UPSETTING, METHOD
OF UPSETTING, AND RESULTING JOINT
Filed May 29, 1944　　　2 Sheets-Sheet 1
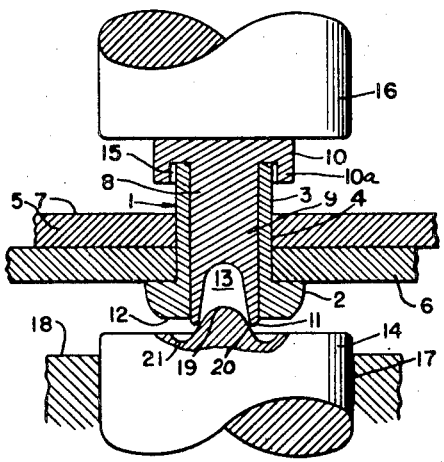
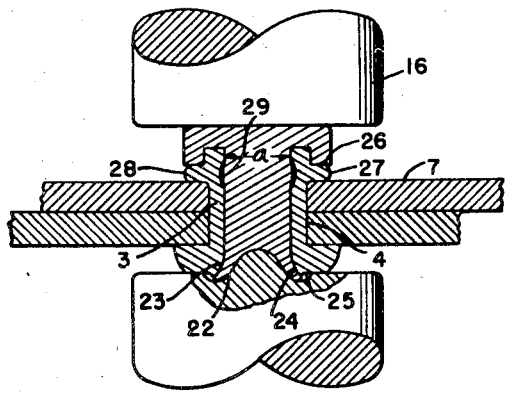
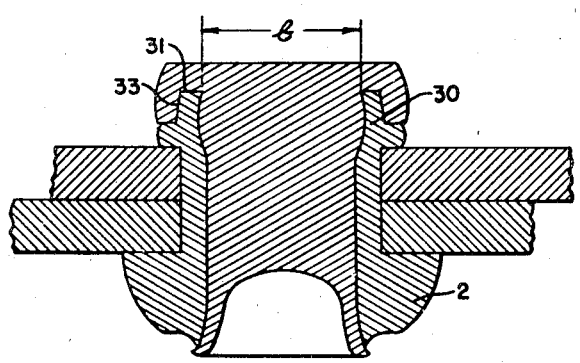
INVENTOR
GEORGE D. RECHTON
ATTORNEY Oct. 12, 1948.  G. D. RECHTON  2,451,356
HOLLOW RIVET FOR PRESSURAL UPSETTING, METHOD
OF UPSETTING, AND RESULTING JOINT
Filed May 29, 1944  2 Sheets-Sheet 2
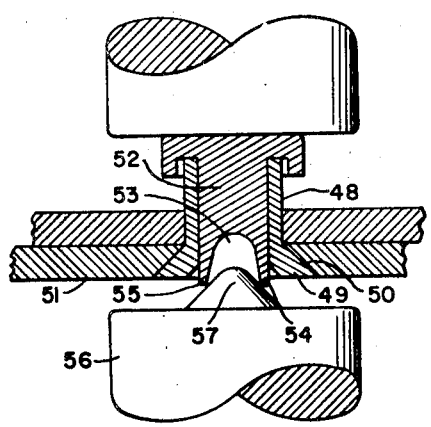
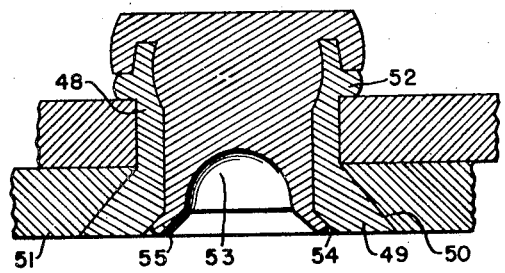
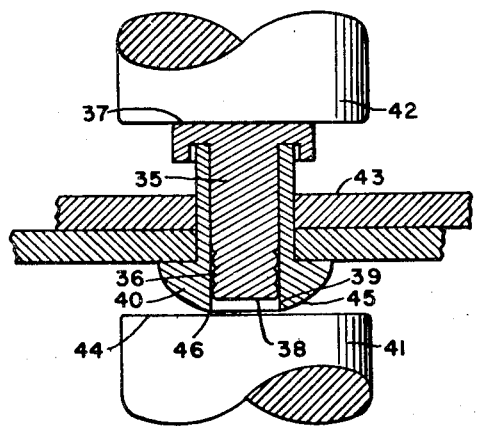
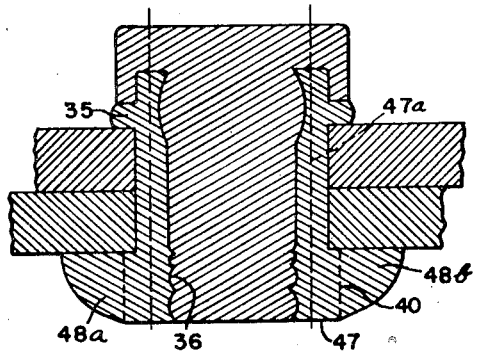
INVENTOR
GEORGE D. RECHTON
BY 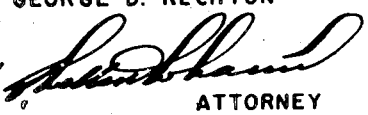
ATTORNEY Patented Oct. 12, 1948

2,451,356

UNITED STATES PATENT OFFICE 2,451,356

HOLLOW RIVET FOR PRESSURAL UPSETTING, METHOD OF UPSETTING, AND RESULTING JOINT

George D. Rechton, Los Angeles, Calif., assignor to Douglas Aircraft Company, Inc., Santa Monica, Calif., a corporation of Delaware Application May 29, 1944, Serial No. 537,797

4 Claims. (Cl. 218—29)

This invention relates to the art of riveting, and concerns novel features of a rivet assembly, and the method of effecting the riveting operation therewith; and the invention resides also in the completed rivet after the application of the riveting method.

The present method is applicable where both sides of the riveted work are accessible.

One of the objects of this invention is to provide a rivet having high shearing strength combined with high tensile strength.

Another object of the invention is to carry out the above stated invention, at the same time providing a rivet which by virtue of its high shearing strength and high tensile strength may be substituted for relatively large bolts as fastening means for assembling structural elements, particularly aircraft parts in which reduction in weight is most desirable.

Another object of the invention is to provide a rivet assembly including a sleeve member and a stem member capable of telescoping together, when inserted in the opening that is to be riveted, and having a correlated form enabling the two members to cooperate upon the application of the upsetting pressure, to effect the upsetting of the unheaded end of the sleeve and shoulder the same over the adjacent edge of the riveted opening; and also to produce an effective interlocking of the stem member and sleeve member to develop a high "push out" characteristic for the stem member.

Another object of the invention is to provide a riveting method of the character indicated above, in which, through the application of the upsetting pressures on the ends of the assembled sleeve member and stem member, the inner, or unheaded, end of the stem member will become interlocked with the headed end of the sleeve member.

This method is preferably applied to a rivet assembly including a preheaded sleeve member and a preheaded stem member which are telescoped together in the rivet opening; and one of the objects of the invention is to provide a form for the head of the stem member which, in the practice of the method, will result in upsetting the projecting unheaded end of the sleeve member so as to form an effective shoulder on the side of the work opposite to that on which the preheaded end of the sleeve is seated.

Another object of the invention is to provide a rivet assembly in which the composition of the stem member and the sleeve member are so related to each other that the application of the upsetting pressure will insure expansion of the sleeve member so that it will tightly fill the rivet opening. This is most advantageous because it is always necessary to have, at first, a slight clearance between the shank or body of a rivet and the rivet opening to facilitate quick insertion of the rivet for riveting. My rivet and method of riveting enables a sufficient amount of clearance to be employed, at the same time insuring that the rivet body will expand and completely fill the rivet opening.

Referring to the drawings in detail,

Fig. 1 is a vertical section taken through a rivet assembly embodying my invention and representing the same between upsetting dies, and also illustrating the "work," consisting of two plates in which the rivet opening is located.

Fig. 2 is a section, like the section of the rivet illustrated in Fig. 1, but illustrating the rivet at a stage of the operation in which the upsetting operation is nearly complete. In this view the anvil die, or forming die, at the lower end of the rivet is illustrated in section and broken away.

Fig. 3 is a view similar to Fig. 2, upon an enlarged scale, and showing the relation of the parts of the rivet after the upsetting operation has been completed.

Fig. 4 is a view similar to Fig. 1, but illustrating the invention as applied to a flush type of rivet; and this view illustrates the preferred shape of forming tool that is employed with this type of rivet.

Fig. 5 is a view upon an enlarged scale, and illustrating the relation of the parts of the completed rivet assembly when it is of the flush type illustrated in Fig. 4.

Fig. 6 is a view similar to Fig. 1, but illustrating a modified embodiment of the rivet assembly and in which the end of the stem member is preformed to facilitate its interlocking with the adjacent preformed head of the sleeve member under the action of the upsetting pressure. In this operation no forming die is necessary such as illustrated in Fig. 1; and Fig. 7 is a vertical section through the rivet assembly illustrated in Fig. 6, upon an enlarged scale, and illustrating the relation of the two parts of the rivet after the upsetting operation has been completed.

Referring now to Fig. 1, which illustrates a preferred embodiment of the rivet assembly, 1 indicates the sleeve member of the assembly which includes a preformed head 2 and a sleeve-form body 3. In practicing the invention, this sleeve member is inserted through the rivet opening 4 that is formed by aligning the two corresponding openings in the work. In the present instance, the work consists of two plates 5 and 6 that are juxtaposed on each other and which are to be secured together by the rivet. When the sleeve member 1 has been applied as indicated, its unheaded end projects considerably beyond the adjacent face 7 of the work so as to present sufficient material to form an effective head on this side of the work.

The rivet assembly also includes a stem member 8 including a shank or stem 9 and a preformed head 10, and this stem member is inserted through the unheaded end of the sleeve 3 so that the shank or stem 9 of the stem member telescopes with the sleeve; and the unheaded end of the stem 9 is formed with an annular lip 11 which preferably projects slightly beyond the end face 12 of the preformed head 2. In the present instance, this lip 11 is developed by providing a relatively deep cup form 13, that is coaxial with the rivet assembly. The depth of this recess 13 would depend upon the character of the upsetting operation that is to take place on the lip 11 and is necessarily only deep enough to enable it to cooperate with the upsetting die, such as the die 14, the form and operation of which will be described more fully hereinafter.

The inner face of the preformed head 10 of the stem member of the assembly is preferably formed with an annular recess or socket 15 into, which the tip of the sleeve 3 projects when the rivet parts are assembled, as shown. This annular recess 15 preferably has a width considerably greater than the thickness of the sleeve, to cooperate in the upsetting operation.

Referring again to the dies, the upper die 16 illustrated may be merely a plunger, and the lower die or anvil die 14 is seated in a socket 17 in an anvil block 18. The die 14 is formed with a coaxial rounded nose 19, the lower portion of which has a substantially conical face 20 to engage the inner side of the lip 11 in the upsetting operation, and toward the base the conical surface 20 merges into a concave annular recess 21.

When the upsetting pressure is applied, the downward movement of the plunger 16 will push the rivet assembly down with the plates 5 and 6, and the conical face 20 cooperating with the recess 21 will upset and expand the lower end of the stem 9, together with the lower portion of the rivet assembly, to give these parts substantially the relation indicated in Fig. 2; that is to say, the lip 11 will be forced outwardly, thereby forming an annular head 22 which is developed by expanding the lower portion of the recess 12. In this way the cylindrical lip 11 is developed into an outwardly and downwardly projecting apron and forms the lower end of the expanded head 22. When this expanded head 22 is formed in this way, the upsetting force expands the bore of the sleeve member at this point so as to give it a more or less "conical" and curved form, as indicated at the point 23, and the radial components of the pressure exerted upon the bore of the sleeve at this point may actually upset the lower face of the head 2 to produce an annular ridge 25 which will lie adjacent to the newly formed expanded head 22 on the end of the rivet stem. At the other end of the rivet, the pressure of the plunger 16 causes the material at the extreme tip of the sleeve 3 to upset and fill the annular recess 15; and, after this occurs, the excess material between the oncoming head 10 and the adjacent face 7 of the work will become squeezed between the inner face 26 of the head 10 and the face 7 of the work to such an extent that the adjacent material in the sleeve will be extruded in an outward radial direction between these faces so as to form an integral collar 27 that shoulders itself over the edge of the opening at the annular zone 28 around the edge of the rivet opening. The pressure on the sleeve at the rivet by the face 26 and also by the bottom of the channel or recess 15, in forming this collar 27, seems to cause a radial shift of the section of material of the stem at about the medial plane of the collar 27, and, in this way, at one stage of the operation a slight outward bowing of the inner face of the sleeve may occur at this point, forming a shallow annular recess 29 extending around the bore of the sleeve. However, by maintaining the upsetting pressure, the compression forces acting on the body of the stem 9 cause upsetting of the diameter of the stem within the sleeve. In other words, the body of the stem, enveloped as it is, by the sleeve, must expand and enlarge itself, thereby forcing the sleeve 3 to expand and completely fill the rivet opening 4, and will also expand the stem into this recess and enlarge it to form a bulge 30 originating in this recess and, if the upsetting pressure is sufficiently maintained, will extend this recess 29 and bulge until the curved contacting surfaces extend all the way up to the tip 31 of the completed rivet sleeve 3. In fact, as the upsetting operation is completed, the combination of the compression forces in the stem, with the confining effect of the upper portion of the sleeve results in an enlarging of the diameter of the stem at its root so that the dimension $b$, as indicated in Fig. 3, is considerably larger than the dimension $a$ at the upper end of the bore of the sleeve when the upsetting process is beginning or has reached the stage indicated in Fig. 2. The result of this is that some of the material in the annular groove 15 will be forced downwardly and out of this groove, exerting a lateral pressure on the inner side of the flange 10a that projects downwardly and forms the lower portion of the preformed head 10. This will give the upper end of the rivet substantially the form indicated in Fig. 3, with an inner face 33 of substantially conical form.

In Fig. 6, I illustrate an embodiment of the invention in which I do not employ any recess at the tip of the stem member. Instead of employing the recess, I provide the periphery of the stem with a plurality of depressions or grooves 36. These preferably extend continuously around the outer surface of the stem and may be formed in the stem by means of dies at the same time that the head 37 is being formed on the stem. In this embodiment of the invention, when the upsetting is to start, the extreme tip 38 of the stem does not extend to the end of the bore 39 in the preformed head 40 of the sleeve member of the assembly, and, instead of employing a forming tool, such as the tool 14 illustrated in Fig. 1, I simply employ a pressing tool or squeezing tool 41 at this end of the rivet which cooperates with a pressing tool or plunger 42 at the other end of the rivet. During the upsetting operation, the upper end of the rivet above the upper face 43 of the work, upsets substantially in the same manner as described in connection with Figs. 1 to 3, except that the finished form of the exterior of the preformed head 37 at the end of the operation is substantially the same as it is when the upsetting operation commences (see Fig. 7).

The pressure against the under face of the preformed head 40 does not produce any substantial enlargement of this head, but the lower end of the stem 35 moves downwardly as the upsetting operation is being performed on the upper end of the rivet. Eventually the extreme end face 38 of the stem 35 arrives at the face 44 of the lower squeeze tool 41. In this connection, attention is called to the shape of the cross section of the preformed head 40 before the upsetting operation begins. It is characterized by convex surface of revolution 45 that intersects with the surface of the bore 39 to form a more or less acute "dihedral" angle 46. By reason of this ridge 46 the upsetting pressure is developed in the sleeve of this rivet close to the stem 35. In the upsetting operation, the pressure of the face 44 against the material "dihedral" angle 46 will produce a flat face 47 at the bottom side of the head 40, and the location of the compression forces that are developed along elements of the sleeve, that is, within the body of the sleeve, will be approximately as indicated by the dotted lines 47a, and will cause the displaced material due to this flattening action, to project itself into the grooves 36, thereby effecting an interlocking connection between the stem 35 and the sleeve member at this end of the rivet. This inward lateral flow of the material into the grooves 36 is also probably enhanced by reason of a clamping effect that occurs against the lower plate adjacent the edge of the rivet opening, that is, about at the location of the lines 47a.

When this riveting method is applied to a flush type rivet, such as illustrated in Fig. 4, the sleeve at the lower end of the sleeve 48 is formed with a conical head 49 received in a conical counterbore 50 that is formed in one of the plates 51 of the work. The lower end of the stem 52 has a recess 53 similar to the recess 13, as shown in Fig. 1, and, if desired, the bore of the sleeve 48 may have a slight counterbore or chamfer 54 adjacent the lip 55 that is formed around the recess 53. The die 56 in this case would have a plane cone tip 57 and the dip or annular recess of the die 14, shown in Fig. 1, is omitted. The result of this is that when the upsetting pressures are applied, the lip 55 will be expanded and upset in an outward direction and into the counterbore or chamfer 54, in this way forming an interlocking connection between the end of the stem and the head 49. The upsetting operation at the upper end of this rivet will be substantially the same as that illustrated in Figs. 1 to 3.

In practicing the invention the stem member of the rivet assembly is preferably of harder material than the sleeve member. The former is preferably Monel metal while the latter is of steel softer than the Monel metal.

Many other embodiments of this invention may be resorted to without departing from the spirit of the invention.

I claim as my invention:

1. A preformed rivet assembly, including: a ductile, one-piece sleeve having a shank of predetermined initial length, said sleeve having a centrally disposed cylindrical bore and terminating at one end in an integral head of the same material; a ductile stem member composed of harder material than the sleeve telescoped coaxially through said bore and having a head integral with one end thereof including an axially extending annular recess in the underside of the head of sufficient radial and axial extent to receive the adjacent end of said sleeve in the uncompressed condition of the assembly; the shank of said stem member being of such a length relative to the length of said sleeve as to extend only slightly beyond the head of said sleeve when said adjacent end of said sleeve contacts the bottom of said annular recess; the extending end of said stem having a central, outwardly diverging depression extending axially therein and defining an annular lip on said end extending beyond the sleeve head when said adjacent end of said sleeve contacts the bottom of said annular recess.

2. A riveted structure comprising: a plurality of members with aligned apertures therein; a continuous sleeve member of ductile material having a central bore extending therethrough and passing through said apertures and having an integral head at one end in pressural engagement with one surface of said structure, the other end of said sleeve extending beyond the structure and having a bulbed radial enlargement in pressural engagement with the other surface of said structure; and a stem member formed of a ductile material harder than that of said sleeve member and filling said bore, and having a head in axial pressural engagement with said enlargement and the end of said sleeve, the other end of said stem member extending through said bore and being formed with an axial depression of substantial depth; the free end of the wall of said depression being flared outwardly in axial and radial compressive engagement with the head of said sleeve member; the intermediate portion of said sleeve member being in radial pressural contact with said stem member and with the walls of said apertures; and the stem member extending into the bulbed radial enlargement of said sleeve member.

3. A method of securing a rivet in aligned holes in a structure comprising: providing a continuous sleeve member of ductile material having a centrally disposed bore of substantially uniform diameter and having a relatively narrow wall and a head integral with one end thereof, inserting said sleeve member in said openings with the unheaded end projecting a substantial distance beyond said structure, providing a stem member formed from a ductile material substantially harder than that of the sleeve member and having at one end an integral head with an annular recess in its underside, and having at the other end a centrally disposed axial depression of substantial depth, the diameter of said stem member being substantially the same as the bore of said sleeve member and the length thereof being slightly greater than the length of said sleeve, inserting said stem member in said sleeve member so that the unheaded end of the latter bottoms in the recess in the head of the stem member with the opposite end of the stem member projecting slightly beyond the head of the sleeve member and with the stem-head spaced from the structure approximately three times the thickness of the wall of the sleeve, applying axially directed compressive forces to the two ends of said stem member to shorten it axially and expand it radially, and continuing the application of said forces to produce axial shortening and radial expansion of said sleeve to set up radial compressive forces between said stem and sleeve and between said sleeve and the walls of said openings and to cause outward buckling of the portion of the sleeve extending beyond the structure and shouldering of said buckled portion against the stem-head and the surface of said structure and also to flare the walls of said axial depression into forcible contact with the adjacent head of said sleeve member and enlarge the head end of the bore of said sleeve to lock the stem member to the sleeve member.

4. A method of securing a rivet in aligned holes in a structure comprising: providing a continuous sleeve member of ductile material having a centrally disposed bore of substantially uniform diameter and having a relatively narrow wall and a head integral with one end thereof, inserting said sleeve member in said openings with the unheaded end projecting a substantial distance beyond said structure, providing a stem member formed from a ductile material substantially harder than that of the sleeve member and having at one end an integral head with an annular recess in its underside, and having at the other end a centrally disposed axial depression of substantial depth, the diameter of said stem member being substantially the same as the bore of said sleeve member and the length thereof being slightly greater than the length of said sleeve, inserting said stem member in said sleeve member so that the unheaded end of the latter bottoms in the recess in the head of the stem member with the opposite end of the stem member projecting slightly beyond the head of the sleeve member and with the stem-head spaced from the structure approximately three times the thickness of the wall of the sleeve, applying axially directed compressive forces to the two ends of said stem member to shorten it axially and expand it radially, and continuing the application of said forces to produce axial shortening and radial expansion of said sleeve to set up radial compressive forces between said stem and sleeve and between said sleeve and the walls of said openings and to cause outward buckling of the portion of the sleeve extending beyond the structure and shouldering of said buckled portion against the stem-head and the surface of said structure and also to flare the walls of said axial depression into forcible contact with the adjacent head of said sleeve member.

GEORGE D. RECHTON.

REFERENCES CITED

The following references are of record in the file of this patent:

UNITED STATES PATENTS

| Number | Name | Date |
|---|---|---|
| 340,117 | Holt | Apr. 20, 1886 |
| 562,060 | Young | June 16, 1896 |
| 642,375 | Simpson | Jan. 30, 1900 |
| 1,067,755 | Price | July 15, 1913 |
| 1,371,364 | Gookin | Mar. 15, 1921 |
| 1,475,827 | Hogarty | Nov. 27, 1923 |
| 1,568,433 | Wheeler | Jan. 5, 1926 |
| 2,030,165 | Huck | Feb. 11, 1936 |
| 2,030,168 | Miller | Feb. 11, 1936 |
| 2,030,170 | Huck | Feb. 11, 1936 |
| 2,061,628 | Huck | Nov. 24, 1936 |
| 2,107,497 | Padgett | Feb. 8, 1938 |
| 2,122,557 | Canter | July 5, 1938 |
| 2,248,755 | Hathorn | July 8, 1941 |
| 2,371,452 | Lees, Jr | Mar. 13, 1945 |

FOREIGN PATENTS

| Number | Country | Date |
|---|---|---|
| 553,333 | Germany | June 24, 1932 |